(No Model.) 4 Sheets—Sheet 1.

T. B. WYLIE.
PROPORTIONAL METER.

No. 596,953. Patented Jan. 4, 1898.

WITNESSES
George Blemming
H. M. Corwin

INVENTOR
Thomas B. Wylie
by Bakewell & Bakewell
his attys.

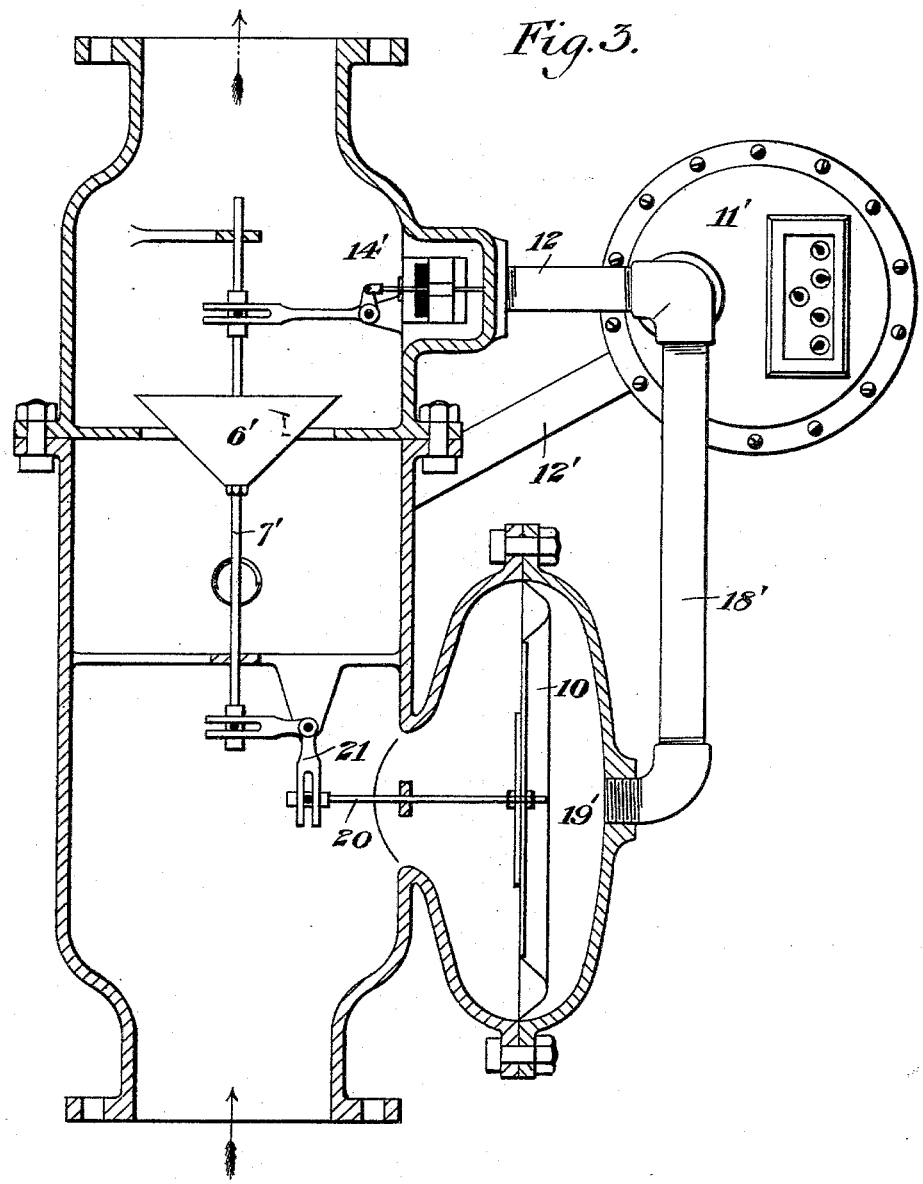

(No Model.) 4 Sheets—Sheet 3.

T. B. WYLIE.
PROPORTIONAL METER.

No. 596,953. Patented Jan. 4, 1898.

WITNESSES
George Blemming
H. M. Corwin

INVENTOR
Thomas B Wylie
by Bakewell & Bakewell
his attys.

(No Model.)

T. B. WYLIE.
PROPORTIONAL METER.

No. 596,953. Patented Jan. 4, 1898.

WITNESSES
George Blemming
H. M. Corwin

INVENTOR
Thomas B Wylie
by Bakewell & Bakewell
his attys.

UNITED STATES PATENT OFFICE.

THOMAS BARTLEY WYLIE, OF ALLEGHENY, PENNSYLVANIA, ASSIGNOR TO THE PITTSBURGH SUPPLY COMPANY, LIMITED, OF PITTSBURG, PENNSYLVANIA.

PROPORTIONAL METER.

SPECIFICATION forming part of Letters Patent No. 596,953, dated January 4, 1898.

Application filed April 6, 1897. Serial No. 630,960. (No model.)

*To all whom it may concern:*

Be it known that I, THOMAS BARTLEY WYLIE, of Allegheny, in the county of Allegheny and State of Pennsylvania, have invented a new and useful Improvement in Proportional Meters, of which the following is a full, clear, and exact description, reference being had to the accompanying drawings, forming part of this specification, in which—

Figure 2:
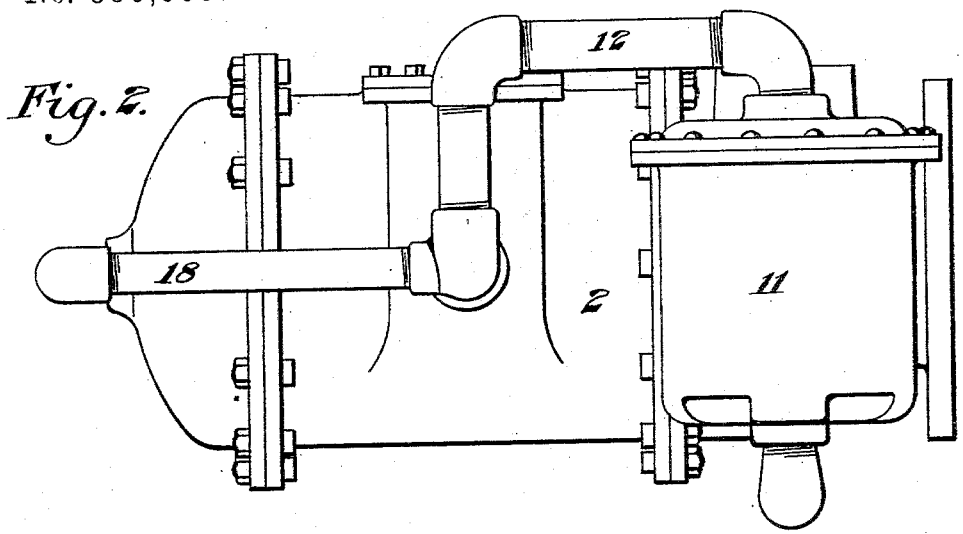
Figure 1:
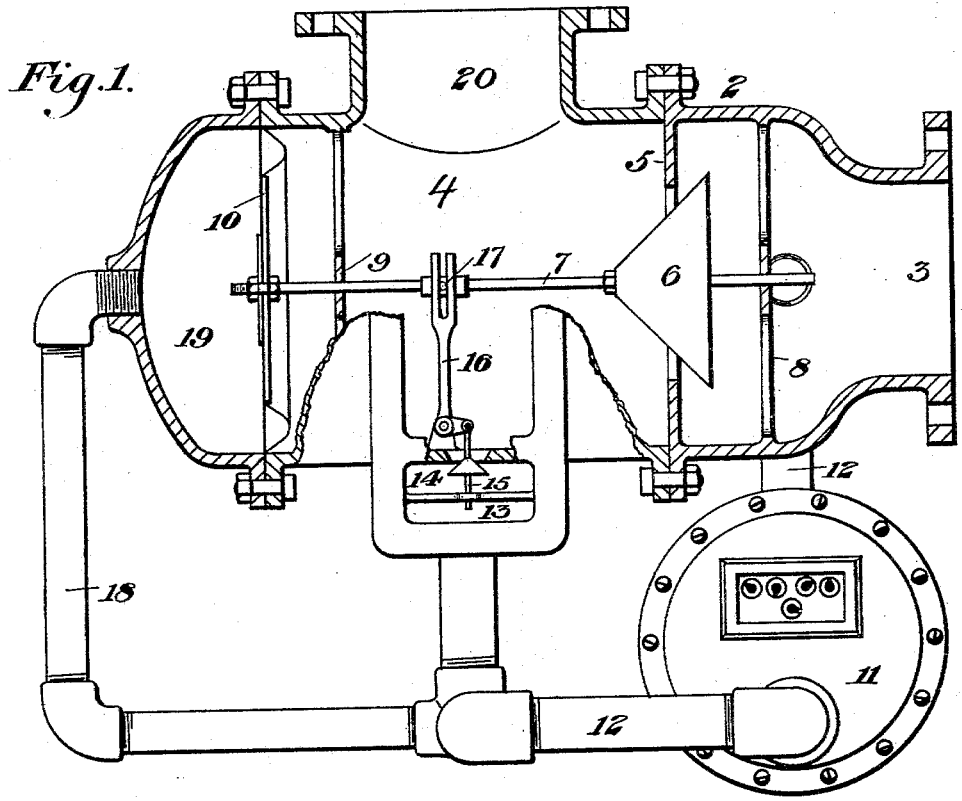
Figure 4:
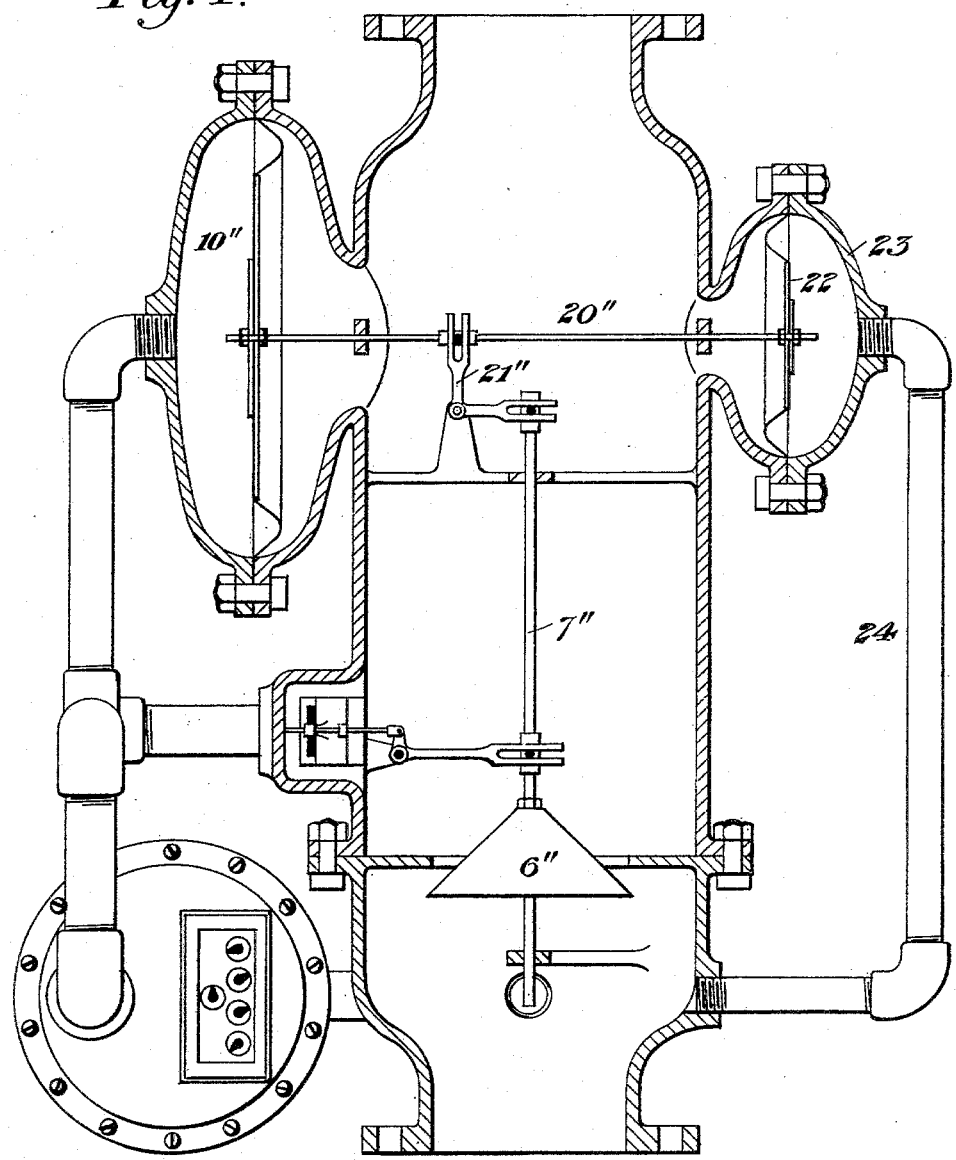
Figure 5:
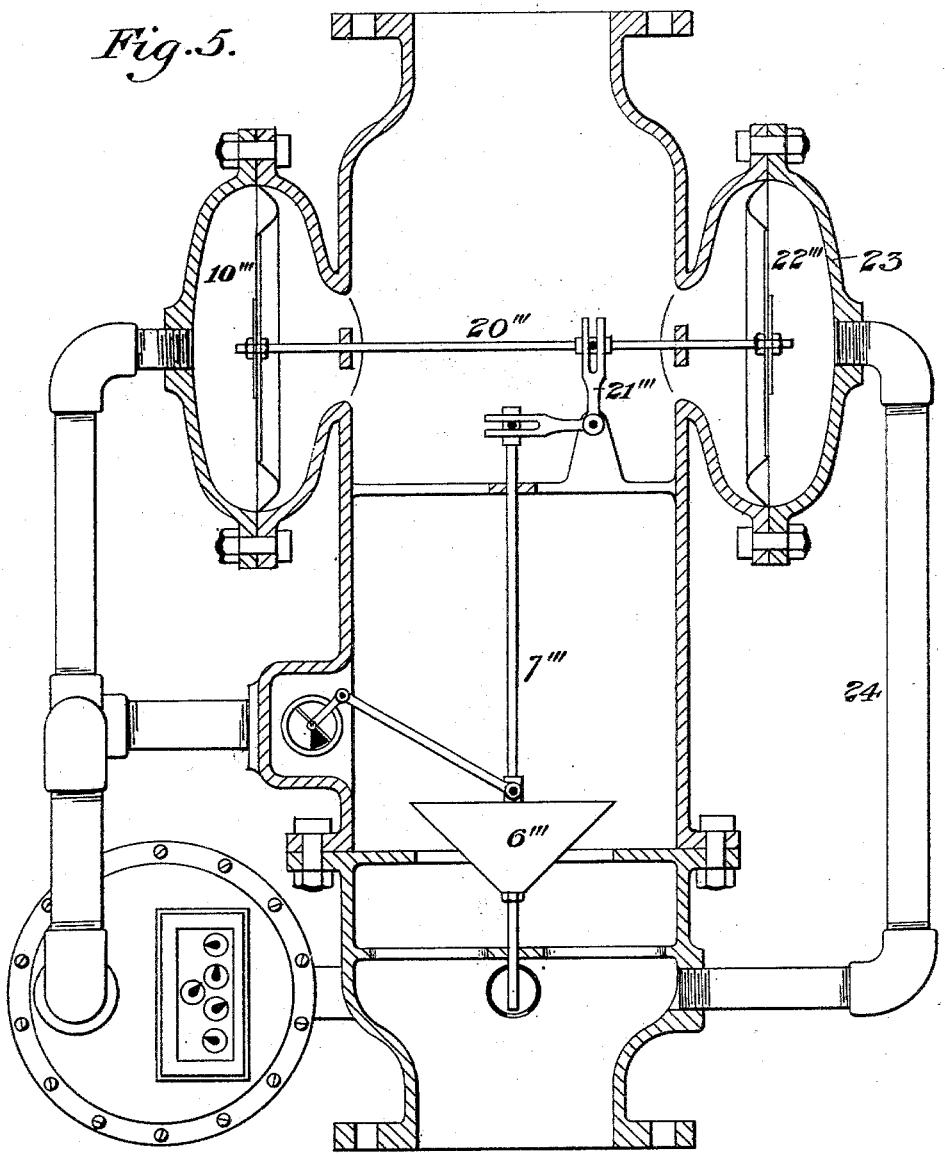

Figure 1 is a horizontal sectional view, partly in elevation, showing one form of my proportional meter. Fig. 2 is a side elevation of the same; and Figs. 3, 4, and 5 are views similar to Fig. 1, showing other forms of my apparatus.

My invention relates to the proportional meters which are employed for determining the volume of fluid passing through a conduit or main, wherein a portion of the fluid is passed through a tally-meter, and it is designed to cheapen and simplify the construction of such meters, as well as make them more accurate in measurements, than has heretofore been possible.

To that end it consists in a proportional meter having oppositely-acting pressure-plates arranged to control by their balance the valves for the measured and unmeasured volumes of the fluid.

It also consists in a valve controlling a direct inlet to the delivery-chamber of the meter, a pressure-plate acted upon by the unmeasured fluid entering the delivery-chamber, which pressure-plate may be constituted by the inlet-valve itself, and a second pressure-plate acted upon by the measured gas passing from the tally-meter, the two pressure-plates controlling the inlet-valve.

It also consists in the last-named combination, wherein the meter delivery-valve, as well as the direct-inlet valve, is controlled by the pressure-plates.

It further consists in the construction and arrangement of the parts, as hereinafter more fully described, and set forth in the claims.

In the drawings, referring to Figs. 1 and 2, in which I show a simple form of my apparatus, 2 represents the casing of the proportional meter proper, and 3 the fluid-inlet therefor. The direct delivery-chamber 4 in the meter is separated from the inlet by a partition 5, having a central inlet-opening controlled by the direct-inlet valve 6. This valve is mounted on a stem 7, which slides longitudinally in guides 8 and 9 within the meter and moves in the direction of the fluid current to close the inlet-opening. To the end of the rod 7 is secured a diaphragm 10, preferably consisting of the usual center plate having a flexible annulus which is secured in the casing.

11 is a tally-meter which is connected to the inlet 3 by the pipe 12. From the tally-meter the fluid which has been measured therein passes through pipes 12 into a valve-chamber 13. This valve-chamber 13 communicates with the delivery-chamber 4 of the meter by an opening which is controlled by a valve 14, mounted upon a stem 15, which at one end is pivotally connected to a bell-crank 16. The bell-crank lever is provided with a forked end portion engaging a pin 17 upon the valve-rod 7, which controls the movements of the meter delivery-valve 14. From the pipe 12 a branch pipe 18 leads into the diaphragm-chamber 19, formed by the diaphragm 10.

The area of the opening for the meter delivery-valve is made such that its ratio to the area of the opening of the direct-inlet valve shall be equal to the ratio of the determined capacity of the tally-meter to the volume of fluid passing to the direct delivery, so that under all degrees of opening of the direct-delivery valve and the meter delivery-valve the proportionate delivery of the meter is constantly equal to the predetermined fraction of the supply-volume with which the capacity of the tally-meter accords. The effective area of the diaphragm 10, which constitutes what I term a "low-pressure" plate, is greater than the effective area of the inlet-valve 6, which in this form is in itself both a valve and what I term the "high-pressure" plate.

The operation is as follows: The fluid entering at 3 passes through pipe 12 to the tally-meter, and having passed through this meter flows through pipe 18 to the diaphragm-chamber 19 until sufficient pressure has accumulated therein to actuate the rod 7, so as to move the valve 6 into an open position, this rod at the same time opening the meter delivery-valve 14. The fluid then passes through the direct-admission valve into the delivery-chamber 4, and also by way of the tally-meter, pipe 12, and meter delivery-valve 14 to the same chamber 4, from which the fluid passes through the outlet 20. To maintain the required proportion of flow of fluid through the direct-admission valve 6 and the meter delivery-valve 14, it is necessary that there shall be a constant ratio of drop through the direct-admission valve and the meter delivery-valve. This ratio of drop or reduction in pressure is obtained and maintained by means of the high-pressure plate constituted by the valve 6 itself, which is opposed by the low-pressure plate 10, of greater area, which is acted upon by fluid of a less pressure—namely, that which is passed through the tally-meter. These two pressure-plates, acting in opposition to each other, force the valve 6 to a position where equilibrium is established between the pressures acting upon the pressure-plates.

If the amount of the absorption of pressure by the tally-meter varies, it is evident that a corresponding variation of pressure will occur in the diaphragm-chamber 19, thus changing the position of the direct-inlet and meter delivery valves to correspond thereto. The friction of the tally-meter therefore is not allowed to affect the ratio of the volume of fluid passing through the proportional valves, and changes in the pressure of the fluid will not change the ratio between the volume of gas passing through the direct-inlet valve and that passing through the tally-meter and its delivery-valve.

Thus, for instance, if in a meter of this type the effective area of the high-pressure plate is one-half the effective area of the low-pressure plate, as these two plates act in opposition to each other, it will require one-half as much pressure acting on the low-pressure plate as that acting on the high-pressure plate to counteract the pressure on the latter plate and force it and the proportional valves to take up such a position that the supply-volume may pass, equilibrium being established between the pressures acting on the two pressure-plates. The difference in the pressures acting on these two plates is of course due to the absorption of pressure by the tally-meter. If the absorption of the tally-meter is equal to one-inch water column, then the difference in the pressures acting on the two pressure-plates and the pressure acting on the high-pressure plate will be two inches and the pressure on the low-pressure plate one inch. In this case the drop through the direct-inlet valve will be two inches and the drop through the meter delivery-valve one inch, and if the relative area of opening of the small valve to that of the large valve is one per cent., the flow through these valves being in proportion to their area and the square root of the drop through them, the volume per square inch of area passing through the direct inlet would be 1.414 times the volume per square inch of area passing through the meter delivery-valve, since the square root of two equals 1.414 and the square root of one equals one.

If the absorption of the tally-meter should increase to, say, two inches water column, the delivery of volume remaining the same, the pressure on the low-pressure plate or diaphragm 10 would be reduced and the pressure acting on the high-pressure plate would remain the same. The proportional valves would then be forced to a more nearly closed position until the pressure accumulated and equilibrium was again established, and the pressure acting on the high-pressure plate will be equal to four inches and that on the low-pressure plate equal to two inches. In this case the drop through the direct-inlet valve is four inches and the drop through the meter delivery-valve two inches. The square root of four being equal to two and the square root of two being equal to 1.414, two divided by 1.414 equals 1.414, the same ratio as before.

If the effective area of the high-pressure plate be equal to one-quarter the effective area of the low-pressure plate, it will take one-quarter as much pressure upon the low-pressure plate to counteract that on the high-pressure plate and give equilibrium. In this case if the absorption of the tally-meter is equal to one-inch water column, then the difference in the pressure acting on the high and low pressure plates will be one inch and the pressure acting on the high-pressure plate will be 1.333, and the pressure acting on the low-pressure plate will be .333, or one-quarter the pressure on the high-pressure plate. The square root of 1.333 is equal to 1.154. The square root of .333 is equal to .577. Dividing 1.154 by .577 we find the relative flow through the valves is equal to two—that is, one-half as much gas passes through the small valve per square inch of area as through the direct-inlet valve. If now the absorption of the tally-meter should increase to, say, two inches, the valves will be forced into a more nearly-closed position until equilibrium is again established. The pressure on the high-pressure plate will then be equal to two and two-thirds inches and the pressure on the low-pressure plate will be equal to two-thirds of an inch or one-fourth pressure acting on the other plate. The square root of two and two-thirds equals 1.632. The square root of two-thirds equals .816, and dividing 1.632 by .816 we find that the ratio of the flow through the valves is two, the same as where the absorption of the tally-meter was one inch.

In Fig. 3 I show another form, wherein the diaphragm 10 is placed in a diaphragm-chamber 19' at the inlet end of the meter, the diaphragm-rod 20 connecting with the bell-crank 21, which is connected with the rod 7' of the inlet-valve 6'. The pipe 12' leads from the inlet side of the meter to the tally-meter 11' and from the tally-meter leads the pipe 12 to the meter delivery-valve 14', the pipe 18' leading to the diaphragm-chamber. In this form the inlet-valve seats in opposition to the fluid current, whereas in Fig. 1 it seats with the current, the direction which it moves in seating being immaterial. The action will evidently be the same as in the form of Fig. 1.

In Fig. 4 I show a form which may be employed where the area of the direct-delivery valve is insufficient, where this valve is small and the friction of the moving parts is large. In this form I employ an auxiliary diaphragm 22 in the diaphragm-chamber 23, to which leads a pipe 24 from the inlet end of the meter. The diaphragm 22 is connected to the diaphragm 10" by the rod 20", which is connected by the bell-crank 21" to the rod 7" of the main inlet-valve 6". It is evident that in this form the entering fluid, pressing upon the high-pressure plate 6", will pass through the pipe 24, and acting upon the diaphragm 22 will act in conjunction with the inlet-valve, their two effective areas being opposed by the area of the diaphragm 10".

In Fig. 5 I show a form similar to that of Fig. 4, except that the direct-inlet valve 6''' seats in opposition to the fluid current, the bell-crank 21''' being correspondingly changed, so that the diaphragm 22''' will coöperate with the same, the effective areas of these high-pressure plates being opposed by the low-pressure plate 10'''.

It is evident that in all these forms the principle of operation is identical—that is, the drop in pressure through the direct-delivery valve is so regulated that the drop in pressure through the meter delivery-valve will always be the same fractional part of it—and in every form is employed the elements necessary to carrying out this principle—namely, one or more pressure-plates which are opposed by one or more pressure-plates acted upon by the fluid which has passed through the tally-meter. It is evident that the high-pressure plate may be constituted by the inlet-valve itself or by some other diaphragm or valve acted upon by the fluid or by a combination of the two.

By the word "pressure-plate" in the claims I intend to cover any form of diaphragm, valve, or plate which is acted upon by the fluid and is so connected as to carry out the principle of my invention whether this pressure-plate is constituted by the valve or valves or by an element separate therefrom.

I claim—

1. A proportional meter containing oppositely-acting pressure-plates connected to each other, said plates controlling by their balance the valves for the measured and unmeasured currents of fluid.

2. A proportional meter containing a valve controlling the flow of measured fluid from the measuring instrument, and having oppositely-acting pressure-plates connected to and arranged to control said valve.

3. A proportional meter containing a valve controlling the flow of the unmeasured current of fluid, and another valve controlling the flow of measured fluid passing from the measuring instrument, said meter having oppositely-acting pressure-plates connected to and arranged to control both of said valves.

4. In a proportional meter, a valve controlling the direct inlet to the delivery-chamber, a pressure-plate acted upon by the entering gas, and a second pressure-plate acted upon by the gas which has passed through the tally-meter, said pressure-plate being arranged to control the direct-inlet valve.

5. In a proportional meter, the combination with a valve controlling a direct inlet to the delivery-chamber, said valve constituting a pressure-plate acted upon by the entering gas, of a second pressure-plate acted upon by the gas which has passed the tally-meter, a valve-controlled passage from the tally-meter to the delivery-chamber, and connections between the direct-delivery and meter delivery valves and the low-pressure plate.

6. In a proportional meter, the combination with a direct-inlet valve arranged to close in the direction of the current, said valve acting as a pressure-plate acted upon by the entering fluid; of a tally-meter connected to the inlet end of the proportional meter; a pipe leading from the tally-meter delivery to a meter delivery-valve opening into the delivery-chamber; a pipe leading from the tally-meter to a chamber containing a low-pressure plate; and actuating connections between the two valves and the low-pressure plate.

In testimony whereof I have hereunto set my hand.

THOMAS BARTLEY WYLIE.

Witnesses:
 G. I. HOLDSHIP,
 H. M. CORWIN.